INVENTOR.
THEODORE L. BERRY,
BY
ATTORNEYS.

INVENTOR.
THEODORE L. BERRY,
BY
ATTORNEYS.

INVENTOR.
THEODORE L. BERRY,
BY
Hazard & Miller
ATTORNEYS.

United States Patent Office 3,004,427
Patented Oct. 17, 1961

3,004,427
FREE POINT INDICATOR FOR DETERMINING THE POINT AT WHICH STUCK PIPE IS FREE IN A WELL
Theodore L. Berry, Santa Fe Springs, Calif., assignor to The Dia-Log Tubular Survey Company, Whittier, Calif., a partnership
Filed Apr. 29, 1957, Ser. No. 656,481
15 Claims. (Cl. 73—151)

This invention relates to a method and apparatus for ascertaining the point or points at which pipe is stuck in a well and where the pipe is free in a well. The invention may be considered as an improvement or further development over the disclosure made in my copending application Serial No. 130,535, filed December 1, 1949 (now forfeited). This application is a continuation in part of my copending application Serial No. 235,533 (now forfeited).

In the course of drilling wells the drill pipe frequently becomes stuck in the well and it is desirable to ascertain as closely as possible the exact point or points where the drill pipe is stuck so that the portion of the pipe which is free above the stuck point can be recovered. In other instances it is desirable to ascertain where casing is stuck in the well and where it is free so as to be able to recover all of the free casing above the stuck point. Sometimes tubing becomes stuck in the well, and it is likewise desirable to ascertain the point or points where the tubing is stuck and where it is free. The present invention relates to a method and apparatus by which the point or points where any pipe of this general character that is used in a well is stuck in the well and where it is free so that the free portion of the pipe can be recovered or other remedial steps may be taken to free the stuck pipe.

In my copending applications there are disclosed measuring instruments which are adapted to be lowered into a pipe in a well for the purpose of ascertaining the points at which the pipe is stuck and where it is free. As a part of the apparatus there is a variable inductance that is electrically connected with instruments on the surface. The parts of this inductance are temporarily seated or anchored within the pipe and the pipe is subjected to a change in stress. The change in stress may be brought about by applying a torque to the pipe tending to twist the pipe. Alternatively the pipe may have a tension applied thereto tending to stretch the pipe. In some instances there may be a combination of torque and tension applied. In still further instances torque or tension, or a combination of both, may be applied to the pipe prior to the seating of the tool and after the tool has been seated the torque or tension or both may be released. Usually the better practice is to take torque and tension readings separately and not a simultaneous combination reading.

In all instances the change in the stress of the pipe affects the variable inductance in a very minute, but nevertheless, measurable manner if that portion of the pipe within which the tool is seated is free and is not stuck. On the other hand, if the tool is seated within a stuck portion of the pipe the change in stress on the pipe has little if any effect on the variable inductance. Consequently, by seating the tool at various points throughout the length of the pipe and electrically measuring the change in inductance occasioned by a change in stress in the pipe, it is possible to ascertain with a relatively high degree of accuracy the exact point or points where the pipe is stuck in the well and where it is free.

The amount of movement between the parts of the variable inductance brought about by the change in stress of the pipe is necessarily quite small, frequently being in the neighborhood of $\frac{1}{1000}''$ or even fractions thereof. It is consequently desirable to be able to accurately set the variable inductance after the tool has been set or positioned within the pipe. In my prior application I disclose a means for mechanically setting the inductance after the tool has been set or positioned in the pipe preparatory to taking a reading of the variation in the inductance occasioned by a change in pipe stress.

A primary object of the present invention is to provide an improved method and apparatus of this general character wherein the variable industance may be set electrically after the tool has been positioned in the pipe preparatory to taking a reading.

Another object of the invention is to provide a friction-type joint between one of the elements of the variable inductance means and its belly springs or equivalent anchoring means which will enable that element of the variable inductance to be set electrically relatively thereto and with relation to the other element of the variable inductance and retain its set position with respect to its belly springs after the setting current has been discontinued.

Still a further object of the invention is to provide a circuit which will facilitate adjustment of the meter used to measure the change in inductance so that intelligible and comparative readings can be obtained. In an instrument of this character it is desirable to supply the variable inductance with an alternating current of relatively low voltage but as the length and consequently the resistance and the capacitance of the conductors from the instrument to the surface will vary widely with different usages of the tool, a means for adjusting the meter to compensate for these variations is highly desirable.

With the foregoing and other objects in view, which will be made manifest in the following detailed description and specifically pointed out in the appended claims, reference is had to the accompanying drawings for an illustrative embodiment of the invention, wherein:

Figures 1A, 1B, 3:
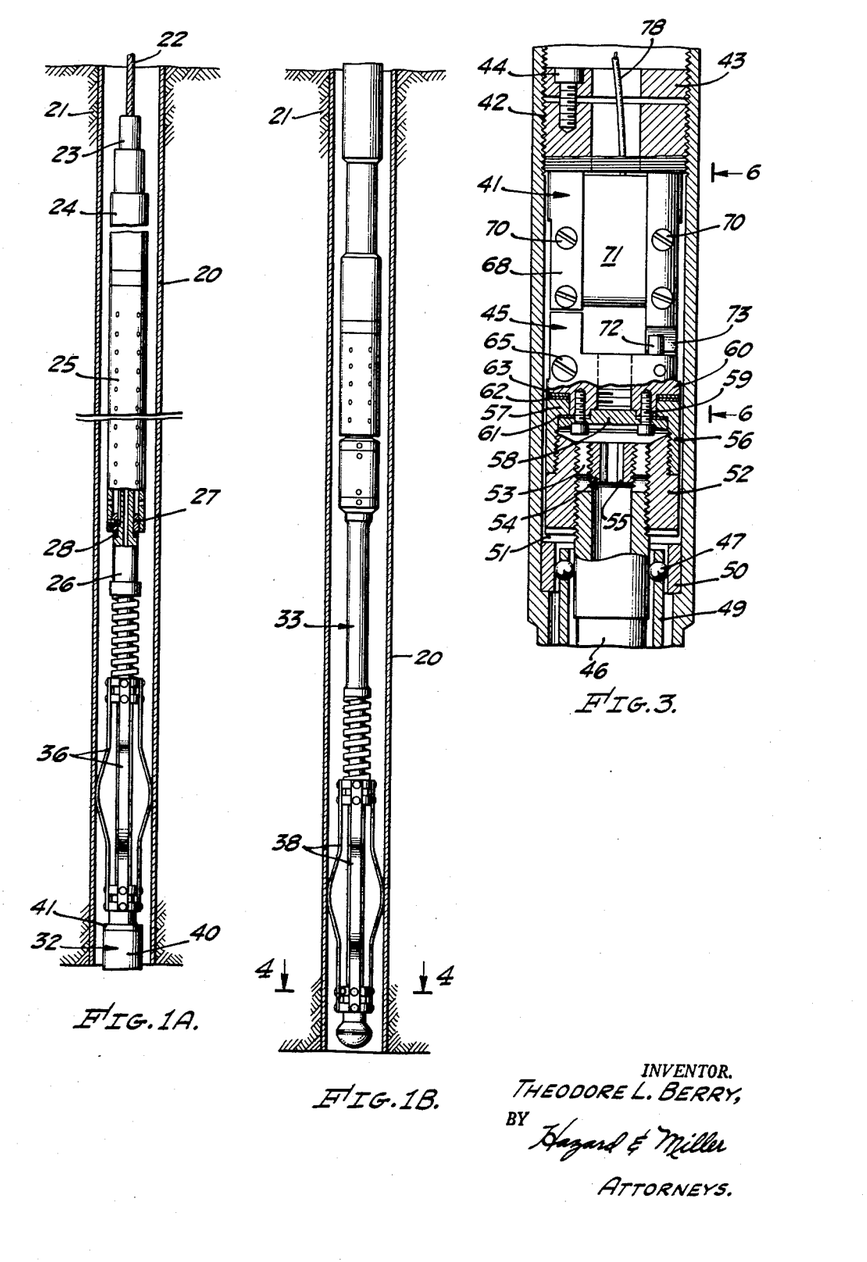
FIGURE 1A is a sectional view through a pipe in a well illustrating the upper portion of the apparatus embodying the present invention disposed therein.
FIG. 1B is a continuation of the lower portion of FIG. 1A illustrating the lower portion of the apparatus.
FIG. 3 is a partial view in vertical section on a somewhat larger scale of that portion of the apparatus illustrated in FIG. 2A.

Referring to the accompanying drawings wherein similar reference characters designate similar parts throughout, the measuring instrument shown in FIGS. 1A and 1B is illustrated as having been lowered within a pipe 20 which is assumed to have been stuck in the formation 21. The instrument is lowered into the well by means of an electric conductor cable 22 which is connected to the body of the instrument by a rope socket 23. There may be weights 24 at the top of the instrument disposed over a set of jars, the elements of which are indicated at 25 and 26. The element 25 is merely a perforated sleeve having an internal shoulder 27 which may engage an external shoulder near the bottom of the element 26 and indicated at 28 or a shoulder on the element 26 that is spaced upwardly from the shoulder 28. When the shoulder 27 engages the shoulder 28 the instrument may be forced downwardly through the pipe 20 and when the shoulder 27 engages the upper shoulder on the element 26, the instrument may be pulled upwardly within the pipe. In any intermediate position the instrument is largely isolated from being in any way influenced by the jars or by the weights 24.

The instrument comprises an upper portion generally indicated at 32, which carries one part of the separable core of a variable inductance. The lower portion of the instrument generally indicated at 33, carries the other part of the separable core of the variable inductance. The upper portion 32 is adapted to be supported, centered, and frictionally anchored within the pipe 20 by a set of belly springs 36. The lower portion of the instrument is similarly adapted to be supported, centered, and frictionally anchored within the pipe 20 by a lower set of belly springs 38. The upper portion 32 and the lower portion 33 are connected together so as to permit a limited rotational and a limited axial or longitudinal movement relatively to each other.

The variable inductance is housed within a housing 40 which is threadedly connected to the jar element 26 on which the belly springs 36 are mounted. The upper part of the variable inductance is indicated at 41, see FIG. 3, and is adjustably mounted within the housing by means of threads 42. A ring 43 is threaded into the upper portion of the housing and screws 44 are receivable through the ring and may be screwed into the top of the upper inductance 41. By tightening the screws 44 the inductance 41 may be locked or held in any adjusted position within the housing 40. The lower part of the variable inductance indicated at 45 is mounted on a tubular support 46 which extends into the housing and is rotatably supported therein by bearings 47 and 48.

The bearings 47 are retained in position about the tubular support 46 by a sleeve 49 in which the bearings are disposed and which functions as a bearing cage. The bearings roll between the tubular support and outer races 50 which are cylindrical in form, permitting a small amount of longitudinal movement of the support 46 relative to the housing 40. This small amount of longitudinal movement that is permitted is represented by the clearance space 51 between the cap or head 52 and the uppermost race 50. Thus it is possible for the tubular support 46 to descend until the cap or head 52 engages the uppermost race 50 and in so doing, the thrust bearing 48 merely descends from its position in engagement with the lower race 50.

The cap or head 52 is threaded onto the tubular support 46 and is locked thereon by splitting the top of the tubular support as indicated at 53 and screwing therein a tapered plug 54. This plug is preferably apertured as indicated at 55. On the cap 52 there is screwed a bonnet 56 presenting an internal flange 57. Beneath this flange there is disposed a disc 58 which is screwed as by screws 59 to the under side of the core holder 60. A brass or equivalent washer 61 is interposed between the disc 58 and the flange 57 on the bonnet and this washer has the screws 59 extending therethrough so that it will move with the disc 58 relatively to the bonnet 56. A similar washer 62 is disposed on top of the bonnet and a steel spring washer 63 is interposed between the washer 62 and the core holder 60. The core holder 60 extends largely across the interior of the housing 40 and is bifurcated at its top to receive a U-shaped soft iron core 64. This core is attached to the core holder, such as by screws 65. The upstanding arms of the core 64 are beveled off in opposite directions as indicated at 66 and 67 on planes that are preferably arranged at 45° to the axis of the tool.

The above-described construction forms, in effect, a friction joint between the core holder 60 and the bonnet 56 which friction joint has its friction largely controlled or affected by the pressure of the spring washer 63. The pressure of this spring washer can be adjusted by the extent to which the screws 59 are tightened. The friction of this friction joint is intended to hold the core holder 60 in a rotationally set position relatively to the bonnet 56, and consequently, relatively to the lower belly springs 38. However, the friction of the friction joint is normally less than the frictional engagement between the lower belly springs 38 and the walls of the pipe. Consequently, if the belly springs 38 tend to rotate in the course of raising or lowering the tool within the pipe beyond the movement permitted by the core holder 60 and core 64, the friction joint merely slips to permit of such rotation of the belly springs. Furthermore, as hereinafter explained, the friction joint will permit rotational movement of the core holder 60 relatively to the bonnet and relatively to the lower belly springs 38 when the re-setting force is applied thereto as hereinafter explained. Re-setting of the core 64 to an initial or starting position is consequently possible while the lower belly springs 38 remain stationarily seated in the pipe, this being permitted by a mere slipping or overcoming of the friction of the friction joint.

The upper part of the inductance 41 consists of a core holder 68 which is bifurcated to receive an inverted U-shaped soft iron core 69. This core is secured in place, such as by screws 70 and centrally thereof there is a solenoid or winding 71. On the core holder 60 there is an upstanding pin 72 engageable with an adjacent shoulder 73 on the core holder 68. This pin serves to limit rotational displacement of the core holder 68 with respect to the core holder 60, compare FIG. 7 with FIG. 6. The pin is sufficiently tall as to continue to limit rotational displacement of the two core holders relatively to each other even when the core holders are separated their maximum distance in a vertical direction, see FIG. 8.

Figures 2A, 2B, 4:
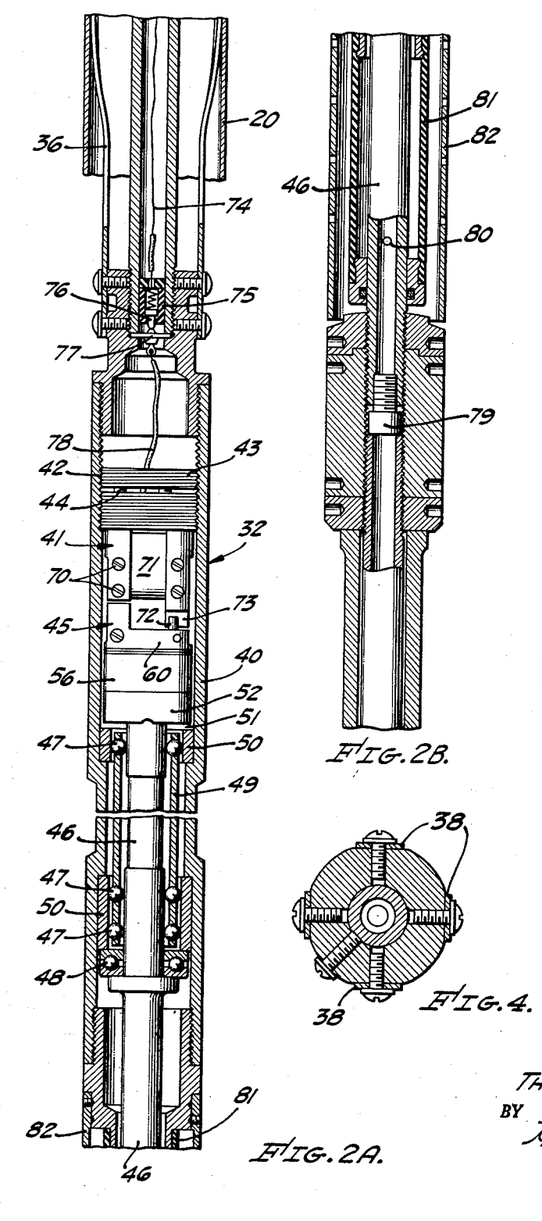
FIG. 2A is a sectional view through the upper portion of the apparatus showing the same on a somewhat larger scale than it appears in FIGS. 1A and 1B.
FIG. 2B is a sectional view through a lower portion of the apparatus.
FIG. 4 is a horizontal section taken substantially upon the line 4—4 upon FIG. 1B.
Figure 2C:
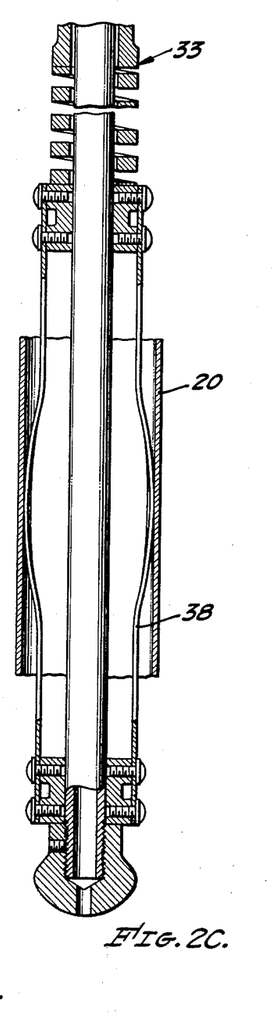
FIG. 2C is a sectional view through the bottom of the apparatus.

The conductor of the conductor cable 22 extends down through the jars and through the upper set of belly springs. Such conductor indicated at 74, see FIG. 2A, leads into an insulated housing 75 in which there is a spring-actuated contact 76. This contact is adapted to engage a contact 77 and a conductor 78 leads therefrom to one side of the winding 71. The other side of the winding is grounded to the tool.

In the preferred form of construction the interior of the housing 40 is filled with clean oil which is confined therein by a plug 79 which closes the bottom of the tubular support 46. This tubular support has one or more apertures 80 therein at a location surrounded by a flexible sleeve 81 which may be formed of rubber or the equivalent. A protecting sleeve or skirt 82 is secured to the bottom of the housing and extends downwardly over the sleeve 81. This sleeve is apertured so that hydrostatic pressure in the well in which the tool is lowered may be transmitted through the protective sleeve 82 and through the flexible sleeve 81 to the oil on the interior of the sleeve 81. The pressure is then transmitted through aperture 80 to the oil on the interior of the housing. In this manner, pressure on the oil within the housing 40 is constantly equalized with the external pressure. The lower end of the sleeve 81 is sealed about tubular support 46 by a rubber O-ring and holder therefor.

Figures 5, 6, 7, 8, 9, 10, 11:
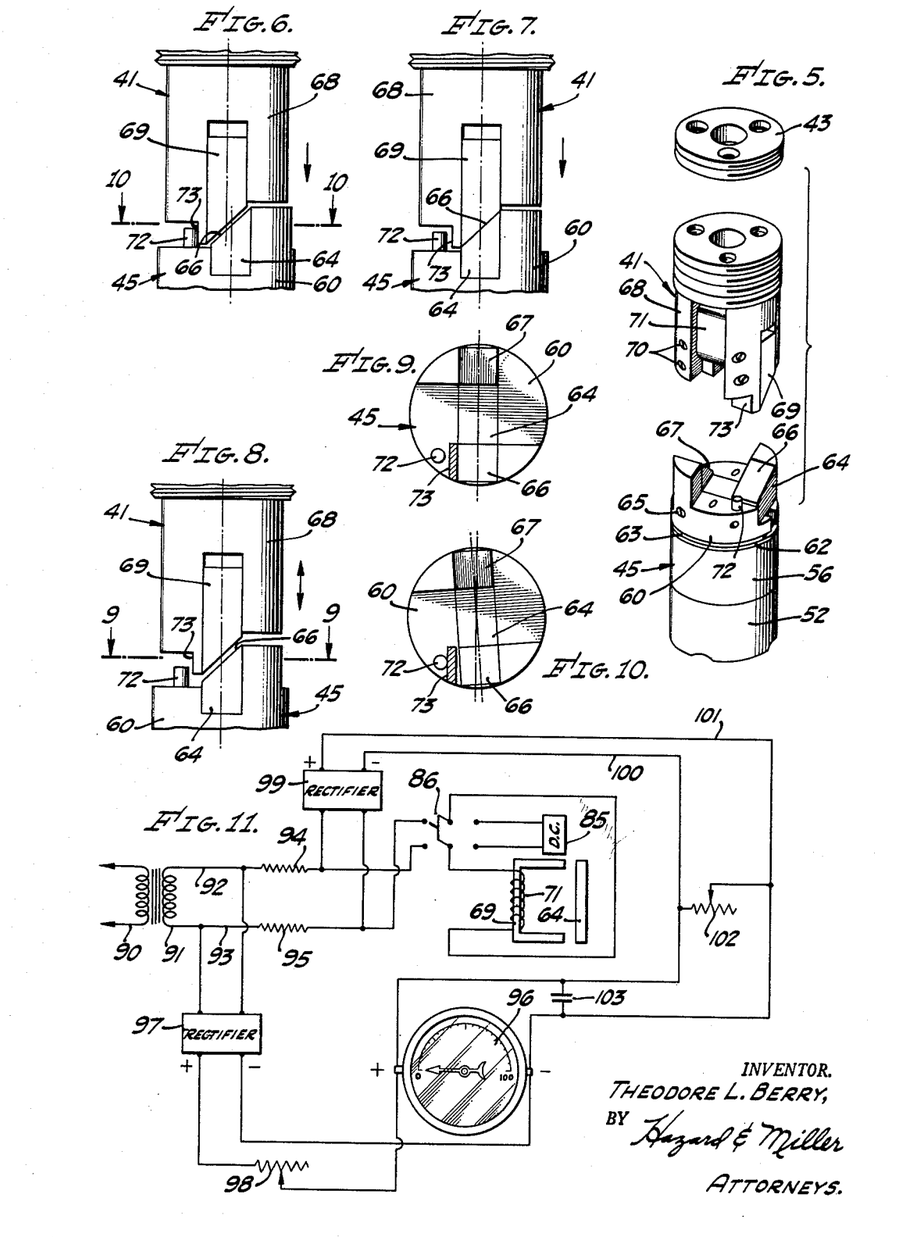
FIG. 5 is an exploded view in perspective of elements of the variable inductance.
FIG. 6 is a partial view in elevation taken in the direction of the arrows 6 upon FIG. 3, and illustrating the inductance elements as having been opened or separated by torque or twisting.
FIG. 7 is a similar view, but illustrating the elements as having been reset in accordance with the present invention.
FIG. 8 is a similar view, but illustrating the elements of the inductance as having been separated by tension.
FIG. 9 is a sectional view taken substantially upon the line 9—9 upon FIG. 8.
FIG. 10 is a sectional view taken substantially upon the line 10—10 upon FIG. 6.
FIG. 11 is a wiring diagram of the electrical circuits employed.

The means for setting or re-setting the variable inductance torque-wise when the tool has been positioned in a pipe in the well consists of a source of direct current indicated at 85, see FIG. 11. This source of direct current may be optionally connected by a switch 86 to the winding 71 and when applied it serves to cause the core 69 to become magnetized and to magnetically attract the core 64 to cause the parts to assume a position as shown in FIG. 7. The core 64, however, is associated with the lower set of belly springs 38 which may be assumed to be frictionally stationary with relation to the pipe 20. When the core 64 is attracted by the magnetized core 69 the core holder 60, together with the disc 58 merely rotate with relation to the bonnet 56 until the complementary inclined faces on the two cores are in mutual engagement or are in the position shown in FIG. 7. When the source of direct current is then cut off by the opening of the switch 86, the two cores will remain in the position shown in FIG. 7, although there will then be no magnetic attraction between them. If the pipe is then stressed by the application of torque the lower core holder 60 will be held in a position by the lower set of belly springs 38. The upper core holder 68 will be shifted by the upper set of belly springs 36, it being assumed that some movement in the pipe takes place between the lower belly springs 38 and the upper belly springs 36. This shift from fully closed position depicted in FIG. 7 to an open position, such as depicted in FIG. 6 varies the reluctance of the magnetic circuit formed by the two cores. The inductance of the winding will consequently vary in a measurable extent and by measuring the change in inductance the amount of gap between the ends of the two cores can be determined which is representative of the twist in the pipe between the lower set of belly springs 38 and the upper set of belly springs 36.

In a similar manner, if a tension is applied to the pipe 20 tending to stretch that portion of the pipe between the belly springs 38 and the belly springs 36, the two core holders 60 and 68 that are associated with the belly springs 38 and 36, respectively, will separate in a vertical direction or in other words, from the position shown in FIG. 7 to the position shown in FIG. 8. The gap between the ends of the two cores 64 and 69 under these circumstances likewise causes a measurable variation in the inductance of the winding 71.

The conditions under which the tool is used in a well vary considerably. The depth to which the tool may be lowered is one important variation which will affect the resistance of the conductor 74. Obviously, if the tool is lowered to a great depth conductor 74 must be of considerable length and will have a greater resistance than if the tool is lowered to only a shallow depth and conductor 74 is consequently shorter. It is desirable to be able to adjust and compensate for these variables and still obtain intelligible readings of the variation in the inductance of the winding 71 when either a torsional strain or a tension strain, or both, are imparted to the pipe. To this end I have shown in FIG. 11 a wiring diagram of the preferred electrical circuits employed. Therein, 90 indicates the primary winding of a transformer which may be assumed to be impressed with 110 volt sixty cycle alternating current. The secondary of this transformer is indicated at 91. The transformer steps down the voltage from 110 volts to approximately 6 volts. Conductors 92 and 93 which includes resistances 94 and 95 lead to the other side of the double throw switch 86 so that after the tool has been set by throwing the switch 86 to connect the direct current source 85 with the winding 71 a low voltage alternating current can then be supplied to the winding 71 by throwing the switch 86 so as to connect conductors 92 and 93 thereto. 96 indicates a very sensitive meter and it is desirable to be able to set this meter so that when the cores 64 and 69 are fully closed as in FIG. 7, the meter needle will read zero. It is also desirable that when the cores 64 and 69 are fully open that the meter needle will read 100 or a full-scale reading. In order to compensate and adjust for various variables that may influence or affect the circuits I connect a rectifier 97 across the conductors 92 and 93 between the resistances 94—95 and the secondary winding 91. The plus side of the output of this rectifier is connected to the plus terminal of the meter 96 and the minus side of the rectifier is connected to the minus side of the meter. One of these connections includes a variable resistance 98.

In a similar manner, a rectifier 99 is connected across the conductors 92 and 93 between the resistances 94, 95 and the switch 86. The plus side of the output of this rectifier is connected to the minus side of the meter 96 and the minus side is connected to the plus side of the meter. Across the lines 100 and 101 which connect the rectifier 99 with the meter 96, I place a variable resistance 102 and a condenser 103. The condenser 103 merely serves to dampen the effect on the meter. To adjust the meter for a given set of conditions in a well the apparatus is lowered into the well to the location where it is desired to take a reading. The switch 86 is thrown to connect the source of direct current 86 to the winding 71 and thus attract the core 64 to the core 69, thus completely closing the gap between the cores. In this position the switch 86 is thrown to connect the alternating current from the secondary 91 to the winding 71. The conditions may be such that when the alternating current is supplied under these circumstances the needle of the meter 96 may read above or below zero. The variable resistance 98 is then adjusted to cause the needle to read zero under these circumstances. The tool is then manipulated so as to fully open or fully separate the two cores 64 and 69. This can be accomplished by lifting on the cable 22 until the internal shoulder 27 engages the upper shoulder on the jar element 26. This will bodily lift the upper set of belly springs 36 relatively to the pipe and lift the upper core holder 68 from the position shown in FIG. 7 to the position shown in FIG. 8. When the air gap or space between the two cores 64 and 69 are thus at a maximum it is desirable that the needle of the meter 96 read 100. Under these circumstances the variable resistance 102 is adjusted, causing the needle to register with the 100 graduation on the dial. In this manner for any given set of conditions the meter may be easily and quickly adjusted to read zero when the cores 64 and 69 are fully closed and to read 100 when the cores are fully open. The tool is then in condition to make a test. In so doing, the cable 22 is lowered causing the shoulder 27 to engage the shoulder 28 and to push the upper belly springs 36 and the upper core holder 68 into their lowered positions with respect to the lower belly springs 38 and the lower core 64. As the tool is forced downwardly through the pipe 20 by the weights 24 the belly springs 36 and 38 merely frictionally drag on the interior of the pipe. The lower set of belly springs 38 being connected to the lower part of the variable inductance tends to force this part into its uppermost position with respect to the upper part of the variable inductance. In other words, the act of lowering the tool into the pipe 20 causes a vertical closing of the variable inductance. This closed position is frictionally retained by the belly springs 36 and 38 when the jar element 25 is lifted into its intermediate position. However, during the descent of the tool, the parts of the variable inductance may have torsionally altered their positions with respect to each other and it is consequently desirable to torsionally return or re-set the parts of the variable inductance into initial or closed positions with respect to each other. To do this, direct current source 85 may again be connected by switch 86 to the winding 71 to close the cores together into the position shown in FIG. 7. When the parts of the variable inductance have thus been closed into the position shown in FIG. 7, it will be appreciated that either a vertical separation of the parts of the inductance or a torsional shifting of one part relatively to the other will create an opening of the gap between the parts. Thus, torsional shifting of one part relatively to the other will cause the parts of the variable inductance to shift from the position shown in FIG. 7 to the position shown in FIG. 6. On the other hand, vertical separation of the parts of the inductance will cause them to shift from the position shown in FIG. 7 to the position shown in FIG. 8. In either event, an opening of the gap between the cores will bring about a measurable change in the inductance. After the variable inductance has been re-set to its initial position, shown in FIG. 7, as above explained, the switch 86 is thrown to discontinue the application of direct current from source 85 and to cause the alternating current to be applied to the winding 71. A torsional strain may then be applied to the pipe 20. If that portion of the pipe between the belly springs 38 and 36 is free or is not stuck, this portion of the pipe will be twisted a slight amount which will cause the cores 64 and 69 to open or separate. In other words, these cores under these conditions will shift from the position shown in FIG. 7, either to or toward a position shown in FIG. 6. The amount of gap between the cores is directly proportional to the amount of twist in the pipe between the belly springs 38 and 36 and is measurable on the meter 96. In the alternative, if the pipe is stuck or frozen in the well between the belly springs 38 and the belly springs 36 this portion of the pipe will not be twisted to any marked degree. Consequently, the cores will not open and no marked or noticeable reading will be obtained on the meter 96.

The operation is substantially the same if a tension is applied to the pipe 20. If the pipe between the belly springs 38 and 36 is free or is not stuck the pipe between the belly springs will be stretched, causing the cores to separate from the position shown in FIG. 7 to or toward the position shown in FIG. 8. The amount of separation is readable on the meter 96. On the other hand, if the pipe is frozen or stuck between the belly springs 38 and 36, this portion of the pipe will not be noticeably stretched, the cores will not open, and no noticeable reading will be obtained on the meter.

By locating the tool at various points within the pipe, adjusting the meter to compensate for factors that may have varied, setting the cores electrically by means of the direct current in closed position at the commencement of each test, it is possible by noting the various readings from the meter to thus determine where the pipe is frozen or stuck in the well and where it is free.

Figure 12A:
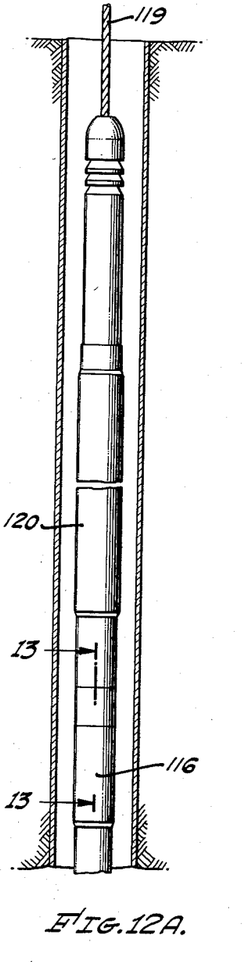
FIG. 12A is a view similar to FIG. 1A, but illustrating an alternative form of construction.
Figures 12B, 13:
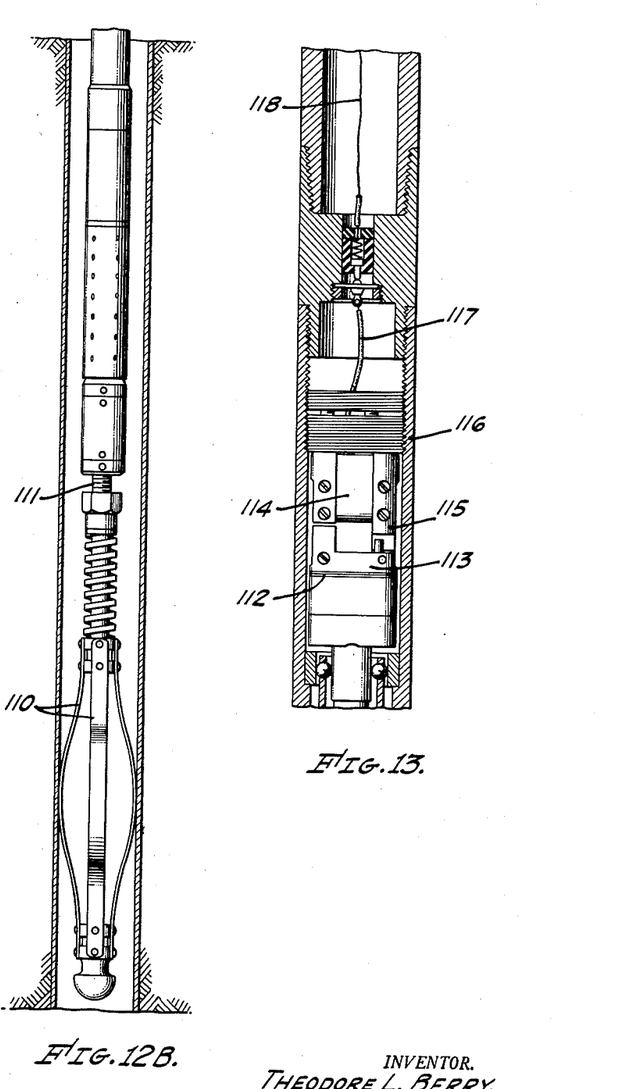
FIG. 12B is a view similar to FIG. 1B, but illustrating the lower portion of the alternative form of the construction.
FIG. 13 is a partial view in vertical section taken substantially upon the line 13—13 upon FIG. 12A.
Figure 14A:
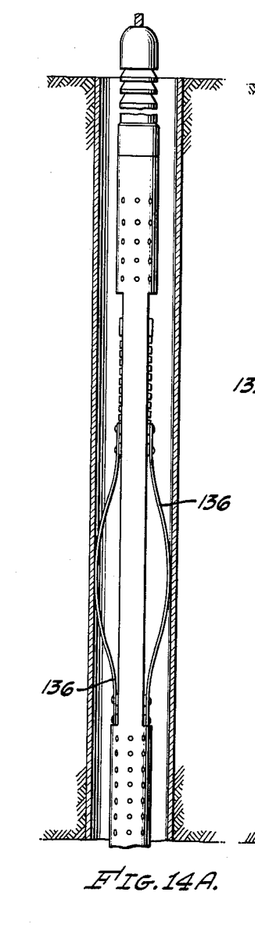
FIG. 14A is a view similar to FIG. 1A, but illustrating still another form of construction.
Figures 14B, 15A:
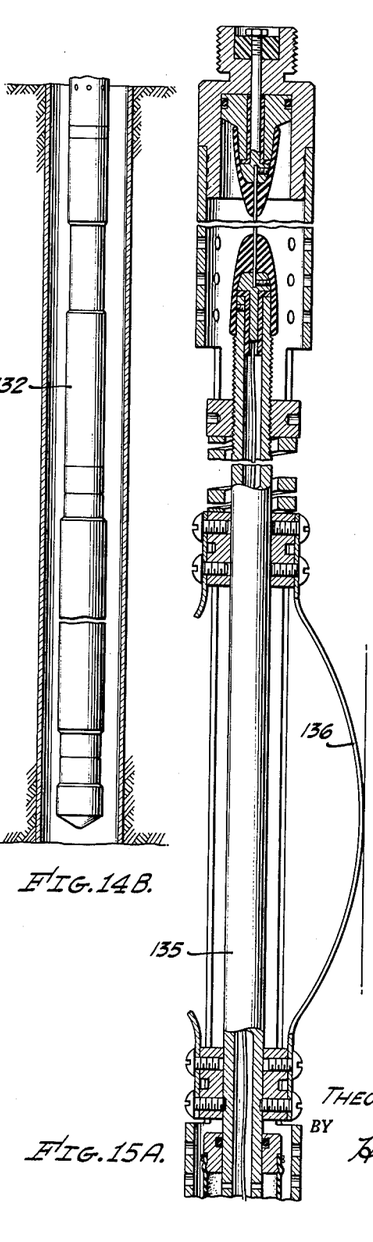
FIG. 14B is a view showing the lower portion of the apparatus shown in FIG. 14A.
FIG. 15A is a partial view in vertical section illustrating details of the apparatus shown in FIG. 14A.
Figure 15B:
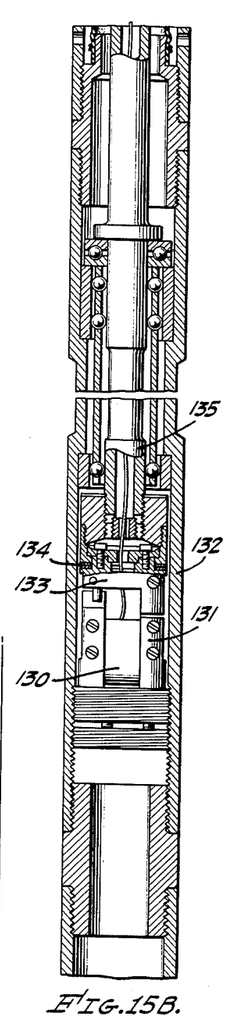
FIG. 15B is a partial view in vertical section illustrating the details of construction of that portion of the apparatus shown in FIG. 14B.

In FIGS. 12A, 12B, and 13, a modified or alternative form of construction is disclosed which is essentially the same as that previously described except that a single set of belly springs 110 are employed which are mounted on the tube 111 that is connected through the friction joint 112 to the lower or movable core 113 of the variable inductance. The winding of the variable inductance in this form of construction is indicated at 114 and has the core 115 energized thereby which, in turn, is mounted within the housing 116. One side of the winding 114 is grounded to the tool and the other side connected through conductors 117 and 118 to the conductor within the suspension cable 119 through weights 120.

In this form of construction the tool may be lowered into the pipe that is to be tested while the pipe is in a stressed condition. Thus, if an upward strain is taken on the pipe to place it under tension the tool may be lowered into the pipe while this condition exists. The belly springs 110 will frictionally engage the interior of the pipe and tend to push the lower core 113 into its uppermost position with respect to the upper core 115. Direct current can then be supplied to the winding 114 causing the core 115 to be energized and to attract the core 113 so that the gap between these cores is fully closed. In so doing, the core 113 may be required to rotate a short distance relatively to the tube 111, such movement being permitted by the friction joint at 112. Under these conditions the tension on the pipe or the upward strain taken thereon is released. If the pipe is free that portion of the pipe which is engaged by the belly springs 110 will move downwardly a short distance causing the core 113 to descend with respect to the core 115 and thus open the gap between the cores. This varies the inductance and a noticeable reading can be obtained upon the meter as previously described. On the other hand, if the belly springs 110 engage the pipe at a point where the pipe is stuck in the well the release of the tension or upward strain on the pipe will not cause that portion of the pipe engaged by the belly springs to descend. Consequently, the gap between the cores 113 and 115 will not open and no noticeable reading will be obtained upon the meter indicating that that portion of the pipe engaged by the belly springs 110 is not free to move under the change of stress imposed upon the pipe.

This form of construction can also be used to make a similar determination by applying a torsional stress. The tool is set in the pipe in the same manner above described while the pipe is under heavy torsional stress. When the tool has been set and the gap between the cores 113 and 115 is closed by the application of direct current to the winding 114, the torque on the pipe can be suddenly released. The body of the tool, together with the core 115 will tend to remain stationary through its own inertia. If the portion of the pipe engaged by the belly springs is free to move upon the release of stress in the pipe the belly springs will be turned slightly, thus opening the gap between the cores, thereby altering the inductance in the circuit and giving a measurable reading on the meter. On the other hand, if the pipe is stuck or frozen at the locality engaged by the belly springs 110, the release of the torsion on the pipe will not cause the belly springs 110 to move and the core 113 will not be rotated relative to the core 115 and no reading on the meter will be obtained. This form of construction can be used where it is desired to quickly make a rough determination of approximately where the pipe is free and where it is stuck.

In the form of construction disclosed in FIGS. 14A, 14B, 15A, and 15B, the construction illustrated is very much the same as that disclosed in FIGS. 12A, 12B, and 13 with the exception that certain parts are disposed in inverted relationship. In this form of construction the winding for the variable inductance is indicated at 130 having a core 131. The winding and core 131 are stationarily mounted within the housing 132 and the movable core 133 is disposed thereabove. The movable core is connected by a friction joint 134 to a tube 135 that is rotatably mounted within the housing 132 and which is capable of a limited vertical movement therein. The tube 135 is connected to belly springs 136 located near the top of the tool and these belly springs are designed to frictionally engage the interior of the pipe to be tested. In this form of construction the operation is substantially the same as previously described. When the tool is set within the pipe direct current is supplied to the winding 130, causing the core 131 to attract the core 133 and close the gap in the variable inductance. If the belly springs 136 are then moved by movement of the pipe, either by the application or the release of stress, the belly springs 136 will cause the core 133 to move either longitudinally or circumferentially with relation to the core 131, thus varying the inductance of the circuit so that a measurable reading can be obtained upon the meter. On the other hand, if the pipe is stuck so that it cannot move by the application or release of stress, the gap between the cores will remain closed and no measurable reading obtained upon the meter.

From the above-described constructions it will be appreciated that the tools herein disclosed are highly advantageous in that the tool is held by the belly springs in coaxial relationship to the pipe to be tested. When so held the cores of the variable inductance can be used to indicate whether the pipe has moved under the application or release of either a longitudinal stress or a torsional stress and a reasonably accurate reading can be obtained. Furthermore, provision is made for electrically setting the tool while in position in the pipe so that the cores of the variable inductance will be drawn into fully closed position prior to applying or relieving stress on the pipe. This setting or resetting of the tool in this manner while in the pipe is highly advantageous. The means employed for adjusting the meter is also advantageous in that it enables comparative readings to be obtained even though conditions with respect to the length and resistance of the conductor from the variable inductance to the surface may vary considerably.

Strain gauges have heretofore been devised consisting of strain-sensing elements having two opposed cores either or both of which may be equipped with a winding. Because of the similarity of the cores 64 and 69 and the winding 71 to the sensing element of such strain gauges, these elements of the present construction may be conveniently referred to as a strain gauge.

Various changes may be made in the details of construction without departing from the spirit and scope of the invention as defined by the appended claims.

I claim:

1. A device of the class described comprising, in combination, a variable inductance having two separable magnetizable members adapted to be lowered into a tubular member in a well, means connecting said members for limited movement relative to each other, means by which each member may be temporarily seated on the tubular member at points which are spaced from each other so that strains or changes of strain imposed on the tubular member may produce relative movement between the members of the inductance, means enabling but resisting relative movement between one of the members and its seating means, means for supplying direct current to the inductance means to cause the members thereof to be mutually attracted to an initial position relative to each other by overcoming the resistance of the last mentioned means, and means for supplying alternating current to the inductance means in lieu of the direct current and measuring thereby the change in inductance, if any, that occurs due to a change of relative position between the members of the inductance when the tubular member is subjected to strain or change of strain.

2. A device of the class described comprising two seating means adapted to be lowered into a tubular member in a well and seated thereon at spaced points therein, a variable inductance including two relatively movable magnetizable parts, means connecting each part to its seating means so as to be movable therewith when the spacing of said points varies on imposing a strain or change of strain on the tubular member, means connecting said parts for limited movement relative to each other, means enabling but resisting movement of one of said parts of the inductance relative to its seating means, means for applying direct current to the inductance to cause the parts thereof to be mutually attracted into an initial position relative to each other by overcoming the resistance of the last mentioned means, and means for applying an alternating current to the inductance and ascertaining therefrom the change of inductance if any which is occasioned by the change of strain in the tubular member between the spaced points.

3. A device of the class described comprising two seating means adapted to be lowered into a tubular member in a well and seated thereon at spaced points therein, a variable inductance including two relatively movable magnetizable parts, means connecting each part to its seating means so as to be movable therewith when the spacing of said points varies on imposing a strain or change of strain on the tubular member, means connecting said parts for limited movement relative to each other, the means connecting one of said parts to its seating means including a friction joint enabling but resisting rotation of the mentioned part relative to its seating means, means for applying direct current to the variable inductance to cause the parts thereof to be mutually attracted and in so doing, causing the last mentioned part to overcome the friction of the friction joint thus orienting the parts into an initial position relatively to each other, and means for applying an alternating current to the inductance in lieu of the direct current and ascertaining therefrom the change if any in the inductance which is occasioned by torsional change of position of the spaced points produced by a change of torsional strain on the tubular member.

4. A device of the class described comprising, in combination, two seating means adapted to be lowered into a tubular member in a well and seated thereon at spaced points therein, a variable inductance including two relatively movable magnetizable parts, means connecting one part to one seating means so as to be movable thereby, means including a rotary friction joint connecting the other part to the other seating means so as to be movable thereby, means connecting said parts for limited axial movement relatively to each other, means for applying direct current to the inductance means to cause the parts to mutually attract and assume initial positions relatively to each other and in so doing overcoming the friction of the friction joint, and means for applying alternating current in lieu of the direct current to the inductance means and ascertaining therefrom the change in inductance when the spacing between the parts is caused to change by a change in relative position of the seating means.

5. A device of the class described comprising, in combination, two seating means adapted to be lowered into a tubular member in a well and seated thereon at spaced points therein, a variable inductance including two relatively movable magnetizable parts, means connecting one part to one seating means so as to be movable thereby, means including a rotary friction joint connecting the other part to the other seating means so as to be movable thereby, means connecting said parts for limited axial movement relative to each other, said parts being separable from each other on opposed inclined planes whereby a separation may take place when the parts are moved vertically or torsionally or both relatively to each other, means for applying direct current to the inductance means to cause the parts to mutually attract and assume initial positions relatively to each other and in so doing overcoming the friction of the friction joint, and means for applying alternating current in lieu of the direct current to the inductance means and ascertaining therefrom the change in inductance when the spacing between the parts is changed by a change in relative position of the seating means.

6. A device of the class described comprising, in combination, upper and lower sets of belly springs adapted to be lowered into a tubular member in a well and to be frictionally seated thereon at two vertically spaced points, a variable inductance including two relatively movable magnetizable parts, means connecting one part to one set of belly springs so as to be movable thereby, means including a rotary friction joint connecting the other part to the other set of belly springs so as to be movable thereby, means connecting said parts of the inductance for limited axial movement relatively to each other, weight means for forcing the tool into the tubular member, said weight means having a limited slidable connection with the tool whereby the tool may be forced by the weight means into the tubular member and cause the parts of the variable inductance to assume their closest position to each other in a vertical direction and the weight means may then be elevated so that the tool may be supported entirely by the belly springs in a position coaxial with respect to the tubular member, the parts of the inductance being separable from each other on opposed inclined planes whereby a separation between the parts may take place when the parts are moved vertically or torsionally or both relatively to each other, means for applying direct current to the inductance means to cause the parts thereof to mutually attract and to torsionally assume initial positions relatively to each other by overcoming the friction of the rotary friction joint, and means for applying alternating current in lieu of the direct current to the inductance means and ascertaining therefrom the change in inductance when the spacing between the parts is caused to change by a change in relative positions of the belly springs.

7. The method of determining the point at which a tubular member in a well is free which includes lowering into the tubular member a variable inductance having two relatively movable magnetizable parts, seating one of the parts on the tubular member at one point, seating the other of said parts on the tubular member at another point, applying direct current to the variable inductance to cause the parts thereof to mutually attract and assume initial positions relatively to each other, discontinuing the application of the direct current, applying an alternating current to the variable inductance, imposing a strain or change of strain on the tubular member for the purpose of varying the position of said points, and ascertaining from a supplied alternating current whether or not there has been a change of position of said points by measuring what if any change there has been in the variable inductance.

8. A device of the class described comprising a conductor cable adapted to be lowered in a tubular member in a well, a variable inductance connected thereto, seating means for temporarily seating the inductance on two spaced points on the tubular member, said seating means including a friction joint which on being overcome will enable the movable parts of the inductance to assume an initial position while the seating means remains seated on the tubular member, means for direct current to the conductor cable and causing the friction joint to be overcome and the strain gauge to assume its initial position while the seating means remains seated, and means for applying alternating current to the conductor cable and determining therefrom whether the inductance has operated in response to a change in position of said spaced points relative to each other when the tubular member has been stressed.

9. A device of the class described comprising an electric strain-sensing means having two parts movable toward and away from each other, means for temporarily mounting at least one of said parts on the interior of a pipe in a well, means for electrically causing said parts to assume a known position relatively to each other after the mentioned part has been mounted on the pipe, and means for determining whether movement of said parts relatively to each other has taken place in response to a change of stress in the pipe.

10. A device of the class described comprising electric strain-sensing means having two relatively movable parts, means including a friction joint for temporarily mounting one of said parts on the interior of a pipe in a well, means for electrically causing one of said parts to assume a known position relatively to the other while mounted on the pipe by overcoming the friction of the friction joint, and means for electrically determining whether or not relative movement takes place between said parts in response to a change of stress in the pipe.

11. A device for determining where a pipe is stuck in a well and where it is free comprising a variable inductance having opposed cores, means for temporarily mounting each core on the interior of a pipe at a locality to be tested, said means including a rotational friction joint enabling one core to be rotated relatively to the other while mounted on the pipe by overcoming the friction of the friction joint, means loosely connecting the cores to each other enabling one core to move vertically relative to the other, a conductor cable by which the cores may be lowered into the pipe and recovered therefrom, a weight suspended by the conductor cable having a limited movable connection with the upper of said cores and by which the cores can be vertically positioned at a known position relatively to each other at the locality to be tested, means for energizing the variable inductance with direct current to rotationally position the cores at a known position at the locality to be tested, and means for electrically determining whether the cores have changed positions relative to each other upon a change of stress in the pipe.

12. A device for determining whether a pipe in a well is stuck and where it is free comprising a variable inductance having two opposed cores, means loosely connecting the cores to each other enabling one to move relative to the other, means for temporarily mounting each core on the interior of the pipe at the locality to be tested, means for energizing the variable inductance with direct current to set the cores at known positions relative to each other prior to testing, and means for electrically determining relative movement between the cores when the pipe is subjected to a change of stress.

13. The method of determining whether a pipe in a well is stuck or free at a selected locality which includes temporarily positioning an electric strain-sensing means on the pipe at the locality to be tested, applying direct current to said means to cause the sensing means to assume an initial known position, discontinuing the application of direct current and applying alternating current to said sensing means and determining therefrom whether the strain sensing means has been actuated by the pipe when the pipe has been subjected to a change of stress.

14. In an apparatus for determining where a pipe in a well is stuck and where it is free, a variable inductance, means for energizing the inductance with alternating current, a meter, a rectifier connected across the source of alternating current for the inductance and connected to the meter, a variable resistance in the connection between the rectifier and the meter, a second rectifier connected across the source of alternating current to the inductance and connected to the meter in opposition to the first rectifier, a variable resistance and a condenser across the connections between the second rectifier and the meter and resistances between the rectifiers.

15. In an apparatus for determining where a pipe in a well is stuck and where it is free, a variable inductance, means for energizing the inductance with alternating current, a meter, a rectifier connected across the source of alternating current for the inductance and connected to the meter, a variable resistance in the connection between the rectifier and the meter, a second rectifier connected across the source of alternating current to the inductance and connected to the meter in opposition to the first rectifier, a variable resistance across the connections between the second rectifier and the meter and resistances between the rectifiers.

References Cited in the file of this patent

UNITED STATES PATENTS

| | | |
|---|---|---|
| 2,354,129 | Langer | July 18, 1944 |
| 2,530,309 | Martin | Nov. 14, 1950 |
| 2,544,400 | Sourwine | Mar. 6, 1951 |
| 2,550,964 | Brookes | May 1, 1951 |